(12) United States Patent
Konisho et al.

(10) Patent No.: US 11,777,632 B2
(45) Date of Patent: Oct. 3, 2023

(54) OPTICAL SIGNAL PROCESSOR

(71) Applicant: Nippon Telegraph and Telephone Corporation, Tokyo (JP)

(72) Inventors: Shiori Konisho, Tokyo (JP); Toshikazu Hashimoto, Tokyo (JP); Kazunori Seno, Tokyo (JP); Mitsumasa Nakajima, Tokyo (JP); Masashi Miyata, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/624,738

(22) PCT Filed: Jul. 5, 2019

(86) PCT No.: PCT/JP2019/026818
§ 371 (c)(1),
(2) Date: Jan. 4, 2022

(87) PCT Pub. No.: WO2021/005641
PCT Pub. Date: Jan. 14, 2021

(65) Prior Publication Data
US 2022/0247508 A1 Aug. 4, 2022

(51) Int. Cl.
*H04J 14/02* (2006.01)
*G02F 1/29* (2006.01)

(52) U.S. Cl.
CPC ............ *H04J 14/0205* (2013.01); *G02F 1/29* (2013.01); *H04J 14/0216* (2013.01); *H04J 14/0221* (2013.01)

(58) Field of Classification Search
None
See application file for complete search history.

(56) References Cited

U.S. PATENT DOCUMENTS

| | | |
|---|---|---|
| 2002/0015554 A1 | 2/2002 | Oguma et al. |
| 2006/0197952 A1* | 9/2006 | Chen ............... G01N 21/554 356/445 |

(Continued)

FOREIGN PATENT DOCUMENTS

| | | |
|---|---|---|
| JP | 2002082241 A | 3/2002 |
| JP | 2014235421 A | 12/2014 |

(Continued)

OTHER PUBLICATIONS

Baxter, et al., "Highly programmable Wavelength Selective Switch based on Liquid Crystal on Silicon switching elements," 2006 Optical Society of America, Mar. 5, 2006, 3 pages.

(Continued)

*Primary Examiner* — Darren E Wolf
(74) *Attorney, Agent, or Firm* — Slater Matsil, LLP

(57) ABSTRACT

An input/output, a wavelength multiplexer/demultiplexer, and a spatial light modulator are provided. The input/output is configured by an optical waveguide into which multiplex light with multiple wavelengths enters. The wavelength multiplexer/demultiplexer performs demultiplexing for forming a plurality of signal lights by spatially demultiplexing the multiplex light emitted from the input/output, by one diffraction, into light of each wavelength, and multiplexing for multiplexing the spatially demultiplexed plurality of signal lights that are different in wavelength. The wavelength multiplexer/demultiplexer is configured by a metasurface. The spatial light modulator reflects each of the plurality of signal lights in a set direction.

8 Claims, 2 Drawing Sheets

(56) References Cited

U.S. PATENT DOCUMENTS

| | | | |
|---|---|---|---|
| 2015/0237420 A1 | 8/2015 | Suzuki et al. | |
| 2016/0248500 A1* | 8/2016 | Okabe | H04B 10/2513 |
| 2018/0074227 A1 | 3/2018 | Nomoto et al. | |
| 2018/0278359 A1* | 9/2018 | Robertson | H04J 14/021 |
| 2019/0206136 A1* | 7/2019 | West | G02B 5/1814 |

FOREIGN PATENT DOCUMENTS

| | | |
|---|---|---|
| JP | 2015158651 A | 9/2015 |
| JP | 2018046395 A | 3/2018 |
| JP | 2018141948 A | 9/2018 |
| WO | 2014050145 A1 | 4/2014 |

OTHER PUBLICATIONS

Miyata, et al., "Pixel-scale Color Splitters Based on Dielectric Metasurfaces," 2018 79th Japan Society of Applied Physics Fall Academic Lecture, Sep. 18, 2018, 3 pages.

\* cited by examiner

OPTICAL SIGNAL PROCESSOR

CROSS-REFERENCE TO RELATED APPLICATION

This application is a national phase entry of PCT Application No. PCT/JP2019/026818, filed on Jul. 5, 2019, which application is hereby incorporated herein by reference.

TECHNICAL FIELD

The present invention relates to an optical signal processing apparatus that switches wavelength multiplexing signals.

BACKGROUND

With the wide spread of the Internet, enlarging the capacity of data communication networks is desired. In order to meet the requirement for enlarging data communication capacity, the wavelength-division multiplexing (WDM) transmission method has been put into practical use, and research on optical signal processing devices supporting the WDM transmission method is progressing. One of the optical signal processing devices to be used in the WDM transmission method is a wavelength selective switch (WSS). The WSS is a switch capable of selecting an optical path for each signal wavelength with respect to a WDM signal, and accordingly flexible switching of optical signals in the WDM transmission has been facilitated.

A general WSS is configured by or includes an input/output optical waveguide, a diffraction grating, a spatial light modulator, and an optical system including a plurality of lenses. The light having propagated through the input/output optical waveguide is emitted into a space, and propagates in the space after it is converted into collimated light by a collimator lens. The propagating light passes through the diffraction grating for light dispersion and the plurality of lenses for light collection, and then is collected to the spatial light modulator. The spatial light modulator applies a desired phase modulation to the optical signal to control a beam reflection direction, i.e., an output port (see Non-Patent Literature 1).

CITATION LIST

Non-Patent Literature

Non-Patent Literature 1: G. Baxter et al., "Highly programmable Wavelength Selective Switch based on Liquid Crystal on Silicon switching elements", Optical Fiber Communication Conference, ISBN: 1-55752-802-0, 2006.

SUMMARY

Technical Problem

The general WSS is configured to cause the light to pass through the diffraction grating twice, in order to sufficiently disperse (separate) the light. Therefore, the propagation distance of the light becomes long because of, for example, the use of such an optical system including a plurality of lenses arranged for light collection, which raises a problem that the apparatus size is large.

The present invention has been made to solve the above problem, and intends to shorten the propagation distance of light and reduce the apparatus size.

Means for Solving the Problem

An optical signal processing apparatus according to an embodiment of the present invention includes an input/output unit configured by or including an optical waveguide into which multiplex light with multiple wavelengths enters, a wavelength multiplexing/demultiplexing unit configured to perform demultiplexing for forming a plurality of signal lights by spatially demultiplexing the multiplex light emitted from the input/output unit, by one diffraction, into light of each wavelength, and multiplexing for multiplexing the spatially separated plurality of signal lights that are different in wavelength, and a spatial light modulation unit configured to reflect each of the plurality of signal lights demultiplexed by the wavelength multiplexing/demultiplexing unit in a set direction.

Effects of Embodiments of the Invention

As mentioned above, according to embodiments of the present invention, the propagation distance of light can be shortened and the apparatus size can be further reduced.

DETAILED DESCRIPTION OF ILLUSTRATIVE EMBODIMENTS

Figure 1:
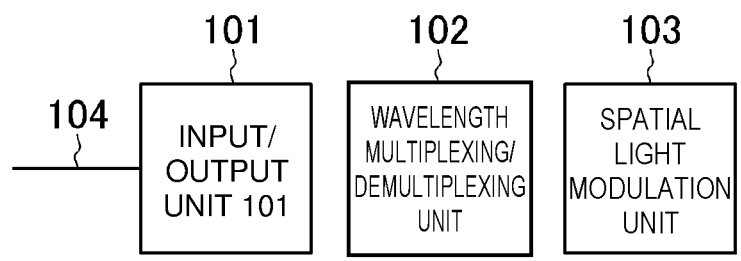
FIG. 1 is a configuration diagram illustrating a configuration of an optical signal processing apparatus according to an embodiment of the present invention.

Hereinafter, an optical signal processing apparatus according to an embodiment of the present invention will be described with reference to FIG. 1. This optical signal processing apparatus includes an input/output unit 101, a wavelength multiplexing/demultiplexing unit 102, and a spatial light modulation unit 103.

The input/output unit 101 is configured by or includes an optical waveguide into which multiplex light with multiple wavelengths enters. The input/output unit 101 includes, for example, a plurality of paths by a plurality of optical waveguides, and each path is provided with an optical fiber 104. The multiplex light is entered from the optical fiber 104 to the input/output unit 101. The wavelength multiplexing/demultiplexing unit 102 performs demultiplexing for forming a plurality of signal lights by spatially demultiplexing the multiplex light emitted from the input/output unit 101, by one diffraction, into light of each wavelength, and multiplexing for multiplexing the spatially separated plurality of signal lights that are different in wavelength.

The wavelength multiplexing/demultiplexing unit 102 can be configured by or can include a metasurface. Appropriately setting the surface structure of the metasurface can obtain higher diffraction property than a general diffraction grating (Reference Literature 1: M. Miyata et al., "Impedance-matched dielectric metasurfaces for non-discrete wavefront engineering", Journal of Applied Physics, vol. 125, 103106, 2019). Further, since the metasurface is a thin-film element that obtains high diffraction property in vertical incidence, it is unnecessary to control the angle of incidence on the metasurface, and the beam propagation distance can be shortened. The wavelength multiplexing/demultiplexing unit 102 can be configured by or can include a highly dispersed diffraction grating capable of performing demultiplexing and multiplexing by one diffraction.

The spatial light modulation unit 103 reflects each of the plurality of signal lights in a set direction. The spatial light modulation unit 103 is configured by or includes an LCOS (Liquid Crystal On Silicon) element, for example. Configuring the spatial light modulation unit 103 to have functions such as light collection and parallel light of an optical system can reduce the number of optical components that require alignment. Since the LCOS element can hold once applied phase information even in a state where no electric power is supplied, the LCOS element can be driven with low power consumption.

The multiplex light entered from the optical fiber 104 to any path of the input/output unit 101 passes through the input/output unit 101, and is spatially separated (demultiplexed) into light of each wavelength by the wavelength multiplexing/demultiplexing unit 102. The separated light is reflected by the spatial light modulation unit 103 to the set direction, and passes through the wavelength multiplexing/demultiplexing unit 102 (multiplexed by the wavelength multiplexing/demultiplexing unit 102). Further, the light passes through any path of the input/output unit 101, and is optically coupled with the optical fiber 104.

According to the present embodiment, the wavelength multiplexing/demultiplexing unit 102 configured by or including the metasurface or the like is used to form a plurality of divided signal lights, by one diffraction, through spatial separation into the light of each wavelength. Therefore, it is unnecessary to adopt the conventional configuration that causes the light to pass through the diffraction grating twice. Further, configuring the spatial light modulation unit 103 to have light collection and collimation functions can shorten the propagation distance of light and can further reduce the apparatus size.

Figure 2:
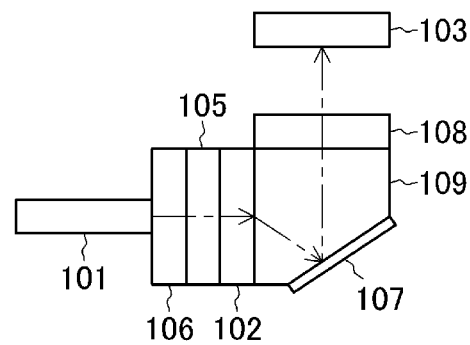
FIG. 2 is a configuration diagram illustrating a detailed configuration of an optical signal processing apparatus according to an embodiment of the present invention.

More specifically, as illustrated in FIG. 2, the optical signal processing apparatus can include a first optical system 105 that converts the multiplex light emitted from the input/output unit 101 into parallel light, and a first spacer 106 arranged between the first optical system 105 and the input/output unit 101 to transmit light. The first optical system 105 can be configured by or can include a condensing lens, for example. Further, the first spacer 106 can be configured by or can include a glass plate. Adhering the first spacer 106 to a multiplex light emission end of the input/output unit 101 and adhering the first optical system 105 to a multiplex light emission side of the first spacer 106 can fix the first optical system 105 at a predetermined position with respect to the input/output unit 101. Such a configuration can simplify the alignment work. The function of the first optical system can be incorporated into the first spacer 106. Adopting such a configuration can further reduce the apparatus size.

The first optical system 105 can also be arranged at a predetermined location by using a lens holder or the like. In this case, the position and angle of the first optical system 105 can be changed later.

Further, it is also possible to use a mirror 107 that changes optical paths of the plurality of signal lights separated by the wavelength multiplexing/demultiplexing unit 102, and a second optical system 108. In this case, the plurality of signal lights whose optical paths have been changed by the mirror 107 are collected to the spatial light modulation unit 103 by the second optical system 108. For example, the mirror 107 can be used in a state where it is attached to a light-transmitting second spacer 109 arranged between the wavelength multiplexing/demultiplexing unit 102 and the second optical system 108. The second spacer 109 is configured by or includes a glass plate and includes an incident surface, an exit surface arranged so as to have a predetermined angle (for example, vertical angle) with respect to the incident surface, and an inclined surface inclined with respect to the incident surface and the exit surface. The mirror 107 is arranged on the inclined surface. Arranging respective components along the folded optical path can downsize the entire apparatus.

Figure 3:
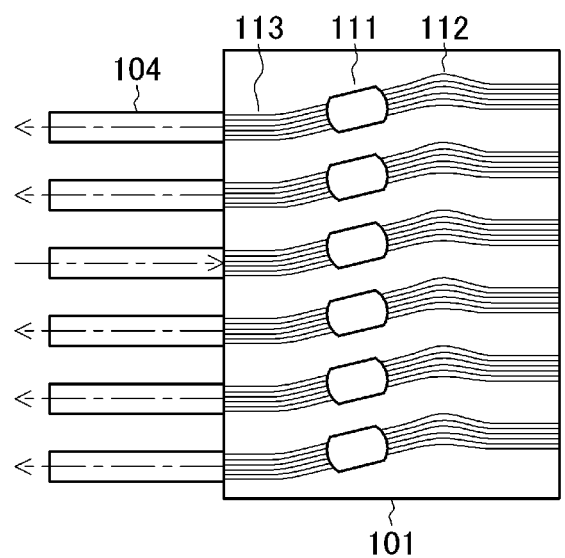
FIG. 3 is a configuration diagram illustrating a partial configuration of another optical signal processing apparatus according to an embodiment of the present invention.

Next, the input/output unit 101 will be described in more detail with reference to FIG. 3. The input/output unit 101 includes a slab optical waveguide 11 into which the multiplex light enters, an array optical waveguide 112 configured by or including a plurality of optical waveguides that are optically connected to the slab optical waveguide 11 and are mutually equal in optical path length. Further, on an incident side of the slab optical waveguide 11, the input/output unit 101 includes a port 113 configured by or including a plurality of optical waveguides. These components may be configured by or include a planar light wave circuit. The input/output unit 101 having the above-described configuration shapes the multiplex light entered via the port 113 into an arbitrary beam shape and emits the shaped light. A plurality of sets of the port 113, the slab optical waveguide 111, and the array optical waveguide 112 may be provided.

Since the plurality of optical waveguides of the array optical waveguide 112 are mutually equal in optical path length, the multiplex light propagates while holding the beam profile and the propagation direction. In this case, in order to control a propagation direction 9 of light emitted from the array optical waveguide 112, it is necessary to appropriately select a connecting position L of the port 113 connected to the slab optical waveguide 11 according to the following expression (Reference Literature 2: Mitsumasa Nakajima et al., "[Invited Lecture] Spatial Planar Optical Circuit Technology for Spatial multiplex Optical Communication", Shingaku Giho, vol. 117, no. 186, PN2017-23, pp. 51-56, 2017).

$$\theta = \sin^{-1}\left(\frac{L}{f_{SBT}} \cdot \frac{d_1}{d_2}\right) \qquad (1)$$

In the expression (1), $f_{SBT}$ represents a waveguide direction length of the slab optical waveguide 11, $d_1$ represents an array pitch of a plurality of optical waveguides of the array optical waveguide 112 on the side connected to the slab optical waveguide 11, and $d_2$ represents an array pitch of a plurality of optical waveguides of the array optical waveguide 112 on the opposite side. In the configuration of the present embodiment, since there is no lens for collecting the beam in a switch axis direction, the beam reflected from the spatial light modulation unit 103 enters the input/output unit 101 at a certain angle θ. In this case, angled beams can be combined by selecting the connecting position L of the port 113 according to the angle θ.

Further, the following relationship holds between a beam diameter $\omega_0$ of light emitted from the input/output unit 101 to the space and a beam diameter $\omega_1$ of light entered from the space to the input/output unit 101.

$$\omega_1 = \frac{f \cdot \lambda}{\pi \cdot \omega_0} \quad (2)$$

In the expression (2), f represents the distance from the input/output unit 101 to the spatial light modulation unit 103, and $\lambda$ represents the wavelength of the signal light. In the conventional WSS, the beam diameter of light input to or output from the input/output unit 101 was designed to be the same. On the other hand, in the configuration of the present embodiment, the beam diameter $\omega_1$ of light entered from the space to the input/output unit 101 is defined as a mathematical function having the variable $\omega_0$ and the variable f. As a result, the beam can be collected for an arbitrary propagation distance f.

Figure 4:
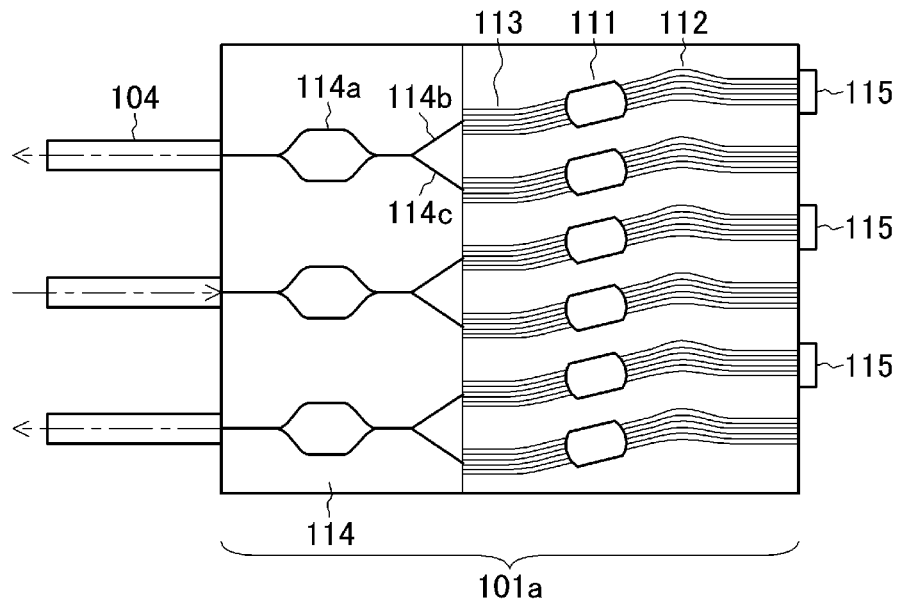
FIG. 4 is a configuration diagram illustrating a partial configuration of another optical signal processing apparatus according to an embodiment of the present invention.

Next, as a configuration of another optical signal processing apparatus according to embodiment 1, an input/output unit 101a will be described with reference to FIG. 4. The LCOS element has the property of reacting only to the light of a certain polarization component. Therefore, when the spatial light modulation unit 103 is configured by or includes the LCOS element, it is necessary to control the polarization state of the incident light. The input/output unit 101a is a planar light wave circuit in which the function for controlling the polarization state is incorporated.

This input/output unit 101a includes a polarization processing unit 114 and a half-wave plate 115, in addition to the slab optical waveguide 11 and the array optical waveguide 112 described above. The polarization processing unit 114 separates the incident multiplex light into TE polarization and TM polarization. The half-wave plate 115 gives a phase difference of 180° to the TE polarization or TM polarization separated by the polarization processing unit 114.

The polarization processing unit 114 includes a Mach-Zehnder interferometer 114a optically connected to the optical fiber 104, and two ports 114b and 114c connected to the Mach-Zehnder interferometer 114a. The slab optical waveguide 11 is connected to these ports 114b and 114c. Further, the half-wave plate 115 is connected to the array optical waveguide 112 connected to one of the two ports 114b and 114c. A plurality of sets of the polarization processing unit 114, the two ports 113, the two slab optical waveguides 111, and the two array optical waveguides 112 may be provided.

The Mach-Zehnder interferometer 114a is configured by or includes two 3 dB couplers, and separates the polarization state of light into TE polarization and TM polarization. The separated TE polarization is, for example, output to the port 114b, and the TM polarization is output to the port 114c. Alternatively, it may be configured to output the TE polarization to the port 114c and output the TM polarization to the port 114b. These components may be configured by or include a planar light wave circuit.

The slab optical waveguide 11 and the array optical waveguide 112 are connected to each of the port 114b and the port 114c. The half-wave plate 115 is provided at a spatially protruding portion only for the array optical waveguide 112 connected to the port 114b to which the TE polarization light is input. As a result, the polarization state of the light output from the input/output unit 101a becomes uniform as TM polarization. The arrangement of the ports 114b and 114c, the slab optical waveguide 111, and the array optical waveguide 112 is designed according to the above-described relationship of expressions (1) and (2).

Figure 5:
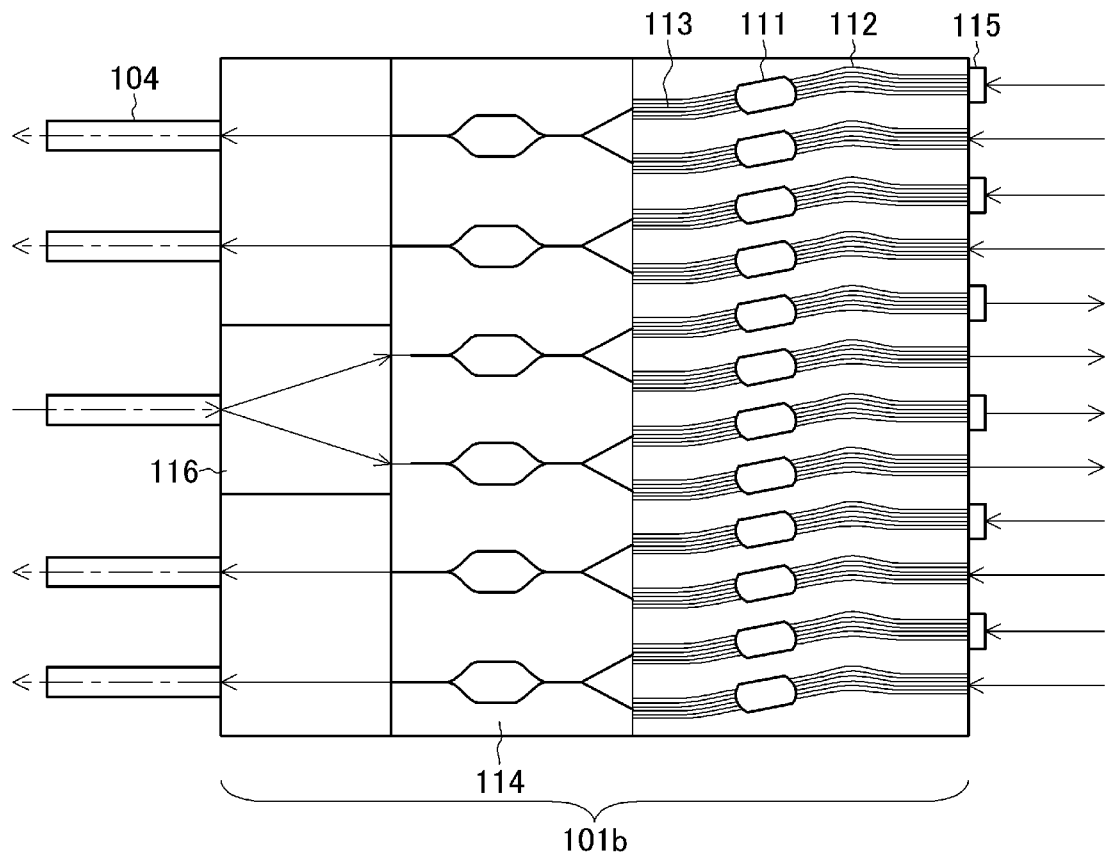
FIG. 5 is a configuration diagram illustrating a partial configuration of another optical signal processing apparatus according to an embodiment of the present invention.

Next, as a configuration of another optical signal processing apparatus according to the embodiment 1, an input/output unit 101b will be described with reference to FIG. 5. In order to improve the frequency utilization efficiency, a circulative filter 116 is used. Using the circulative filter 116 can divide the optical signal into an even-numbered channel and an odd-numbered channel, and the spatial light modulation unit 103 can be irradiated separately. As a result, it is possible to reduce the crosstalk when switching the output port.

The input/output unit 101b includes the circulative filter 116 of 1-input/N-output provided on the incident side, the polarization processing unit 114, and a beam forming portion configured by or including the port 113, the slab optical waveguide 111, and the array optical waveguide 112. These components can be configured by or can include a planar light wave circuit. For example, a set of the polarization processing unit 114, two ports 113, two slab optical waveguides 111, and two array optical waveguides 112 is connected to each of N destinations branched by the circulative filter 116. The configuration of the 1-input/N-output circulative filter 116 is described in Reference Literature 3 (T. Goh et al., "Optical Nyquist-Filtering Multi/Demultiplexer with PLC for 1-Tb/s Class Super-Channel Transceiver", Optical Fiber Communications Conference and Exhibition, Tu3A.5, 2015).

From the input/output unit 101b, 2×N lights that are obtained by multiplying the number of outputs with the number of polarized waves are emitted toward the spatial light modulation unit 103. Next, the light separated by the spatial light modulation unit 103 and advancing toward the input/output unit 101b is propagated along the above-described path in the opposite direction. In the spatial light modulation unit 103, 2×N light beams are reflected and input to the input/output unit 101b. The half-wave plate 115 is placed at a portion where a spatial optical system in which the spatial light modulation unit 103 is present is connected to the input/output unit 101b. In such a way as to follow this, the array optical waveguide 112, the slab optical waveguide 11, the polarization processing unit 114 by the Mach-Zehnder interferometer are connected. The TE wave and the TM wave are multiplexed by the polarization processing unit 114, and a total of N output lights are generated.

As described above, according to embodiments of the present invention, the wavelength multiplexing/demultiplexing unit is configured to form the multiplex light emitted from the input/output unit into a plurality of signal lights, by one diffraction, through spatial separation (division) into the light of each wavelength. Further, the spatial light modulation unit is configured to have light collection and collimation functions, so that the number of optical components can be reduced, the propagation distance of light can be shortened, and the apparatus size can be reduced.

The conventional WSS is an optical element including a plurality of lenses, a diffraction grating, and a reflection surface. This conventional WSS is configured to cause the light to pass through the diffraction grating twice for light coupling and dispersion, and therefore uses the plurality of lenses to meet the requirement. Since the optical path length has been extended to twice the focal length of each lens, the apparatus size has increased. Further, since the number of members that configure the WSS is large, the alignment work is complicated. From these factors, the conventional WSS is expensive in mounting cost. As described above, conventionally, the alignment work is complicated since the number of members that configure the WSS is large. The embodiments of the present invention can shorten the beam propagation distance and can reduce the apparatus size. Further, embodiments of the present invention can simplify the alignment work because of reduction in the number of constituent members.

The present invention is not limited to the embodiments described above. It is apparent that many modifications and combinations are feasible by those with ordinary knowledge in the art, within the technical idea of the present invention.

REFERENCE SIGNS LIST

101 . . . input/output unit
102 . . . wavelength multiplexing/demultiplexing unit
103 . . . spatial light modulation unit
104 . . . optical fiber

The invention claimed is:

1. An optical signal processing apparatus comprising:
an input/output comprising:
  a slab optical waveguide into which multiplex light with multiple wavelengths enters;
  an array optical waveguide optically connected to the slab optical waveguide, the array optical waveguide comprising a plurality of optical waveguides that are equal in optical path length;
  a polarization processor configured to separate the multiplex light into TE polarization and TM polarization; and
  a half-wave plate configured to give a phase difference of 180° to the TE polarization or the TM polarization separated by the polarization processor
a wavelength multiplexer/demultiplexer configured to perform demultiplexing for forming a plurality of signal lights by spatially demultiplexing the multiplex light emitted from the input/output, by one diffraction, into light of each wavelength, and to perform multiplexing for multiplexing the spatially demultiplexed plurality of signal lights that are different in wavelength, the wavelength multiplexer/demultiplexer comprising a metasurface;
a spatial light modulator configured to reflect each of the plurality of signal lights demultiplexed by the wavelength multiplexer/demultiplexer in a set direction, the spatial light modulator comprises a Liquid Crystal On Silicon element;
a mirror configured to change optical paths of the plurality of signal lights forming a plurality of changed signal lights;
a second optical system configured to collect the plurality of changed signal lights to the spatial light modulator; and
a second spacer arranged between the wavelength multiplexer/demultiplexer and the second optical system, to transmit light.

2. The optical signal processing apparatus of claim 1, wherein the input/output further comprises a circulative filter on an incident side of the input/output.

3. The optical signal processing apparatus of claim 1 further comprising:
a first optical system configured to convert the multiplex light emitted from the input/output into parallel light; and
a first spacer arranged between the first optical system and the input/output, to transmit light.

4. A method comprising:
forming an input/output comprising an optical waveguide into which multiplex light with multiple wavelengths enters, wherein forming the input/output comprises:
  forming a slab optical waveguide into which the multiplex light enters;
  forming an array optical waveguide optically connected to the slab optical waveguide, the array optical waveguide comprising a plurality of optical waveguides that are equal in optical path length;
  forming a polarization processor configured to separate the multiplex light into TE polarization and TM polarization; and
  forming a half-wave plate configured to give a phase difference of 180° to the TE polarization or the TM polarization separated by the polarization processor;
forming a wavelength multiplexer/demultiplexer configured to perform demultiplexing for forming a plurality of signal lights by spatially demultiplexing the multiplex light emitted from the input/output, by one diffraction, into light of each wavelength, and to perform multiplexing for multiplexing the spatially demultiplexed plurality of signal lights that are different in wavelength;
forming a spatial light modulator configured to reflect each of the plurality of signal lights demultiplexed by the wavelength multiplexer/demultiplexer in a set direction;
forming a mirror configured to change optical paths of the plurality of signal lights forming a plurality of changed signal lights;
forming a second optical system configured to collect the plurality of changed signal lights to the spatial light modulator; and
forming a second spacer arranged between the wavelength multiplexer/demultiplexer and the second optical system, to transmit light.

5. The method of claim 4, wherein the wavelength multiplexer/demultiplexer comprises a metasurface.

6. The method of claim 5, wherein:
the spatial light modulator comprises a Liquid Crystal On Silicon element.

7. The method of claim 6, wherein the input/output further comprises a circulative filter on an incident side of the input/output.

8. The method of claim 7 further comprising:
forming a first optical system configured to convert the multiplex light emitted from the input/output into parallel light; and
forming a first spacer arranged between the first optical system and the input/output, to transmit light.

* * * * *